Patented Feb. 5, 1946

2,394,440

UNITED STATES PATENT OFFICE 2,394,440

PREPARATION OF PRESSURE-SENSITIVE ADHESIVE

Philip L. Gordon, New York, N. Y.

No Drawing. Application October 14, 1942, Serial No. 461,992

2 Claims. (Cl. 260—23)

This invention relates to synthetic compositions suitable for adhesives, and to material coated or laminated therewith, and to processes of making the same, and is herein disclosed in some detail as embodied in a material chemically called a synthetic resin but adapted to serve as a pressure-sensitive adhesive, such as may be used for coating Cellophane or paper or other film or even woven cloth to make the self-sealing binding tape commonly sold under the name of Scotch tape.

Scotch tape requires an adhesive coating possessing several special characteristics. It is not enough that the adhesive coating be sticky or tacky. The adhesive coating in addition to being sticky or tacky must be one that will adhere immediately to a surface on which it is pressed, must not yield by slipping even during a prolonged pull, must be odorless, for most purposes must be non-toxic so that it may be freely used in food stores, must be stable over a period of over upwards of three months in all kinds of climate, must be non-staining, must not soften with ordinary moisture, and preferably should be colorless or nearly colorless.

It is not sufficient that the material be sticky or tacky. It must show such adhesion when sealed down by pressure that it adheres instantly without slipping, yet the tenacity of its hold must be limited in such a way that the rolled up tape may be unrolled for applying to a package and sealing the tape thereon, and the tenacity and consistency must be such that the uncoated side of the tape is free from residual tackiness and free from sticky particles.

The nearest approach to a perfect coating for Scotch tape has hitherto been based on crepe rubber, but such rubber required special working, special mixtures, often deteriorated unless special preservatives were added to it, and even the best of the crepe rubber materials were far from ideally perfect.

According to the present invention suitable adhesives for coating Scotch tape, and for many other uses, are made from easily obtainable materials by procedures based on steps which are well known for producing other materials for other products and which may be carried out by the ordinary equipment of a resin-producing chemical plant.

The resulting coating material is found to be reasonably stable, especially if a little ester gum is added, to adhere to a very wide variety of surfaces, to adhere firmly, and instantaneously and to be satisfactory in all the other ways referred to above.

Other features and advantages will hereinafter appear.

One material was prepared by reacting pure white castor oil with maleic anhydride to produce a thick clear oily material using equi-molecular proportions of each.

The oily material was then treated with vinyl acetate (unpolymerized) in the presence of a catalyst and while dissolved in an inert solvent at a boiling temperature. After about forty-five minutes the material became gelled. The reaction was then stopped by adding enough additional inert solvent to dilute the mixture so that reaction ceased. The resulting material, when free from liquid was found to contain very little of the vinyl acetate in any form.

The jelly was put through a colloid mill, or mill suitable to convert into a homogeneous mass a pasty or nearly liquid mass with a tendency to carry small lumps, to yield a mass which was spread on paper by means of a roll and doctor bar. The adhesive tape thus made, after evaporation of the solvent, adhered well and instantaneously, did not deteriorate in any reasonable length of time, and was fully as satisfactory as the best available Scotch tape heretofore made for the purposes for which that tape is usable.

It was found possible to substitute aconitic acid for the maleic acid, and also to substitute itaconic acid for it. Fumaric and citraconic acids were unsatisfactory under the conditions of working.

In one instance 7½ parts of maleic anhydride was heated with 45 parts of castor oil at 150° C. for one hour producing a clear, amber colored viscous oily reaction product.

The adhesive was made by heating the reaction product thus obtained with monomeric vinyl acetate in a suitable inert solvent in the presence of a catalyst until a gel was formed. The reaction was halted by adding more of the solvent as soon as the gel was obtained.

The properties of the resulting gel were modified by introducing solutions of resin such as rosin or ester gum.

For example, 75 parts of the monomeric vinyl acetate were heated for 45 minutes in a reflux condenser with 100 parts of the castor oil-maleic reaction product with the addition of 2 parts of acetyl benzoyl peroxide and 400 parts of the toluol substitute known as Nevsol made by the Neville Company. Then 300 parts of the Nevsol were added and the mixture was run through a colloid mill.

It was possible to use toluol instead of the Nevsol but the Nevsol was preferred for reasons of availability in war time.

The resins tested were rosin, hydrogenated rosin, ester gum, cumarone-indene, terpene resin, and glyceryl phthalate. All these were compatible but modified the degree of adhesiveness. When 100 parts of the resin were added in solution, the terpene resin gave poor adhesion, the glyceryl phthalate mixture was soft and sticky, while the other resins named gave tenacious pressure-sensitive adhesives. These latter actually increased the tenacity.

An increased ratio of maleic anhydride did not vary the results because the excess of the maleic anhydride sublimed and was lost. A smaller ratio of the anhydride resulted in softer, less tenacious adhesives.

An increased proportion of vinyl acetate did not materially change the product since only a certain quantity reacted, the remainder being left unpolymerized and unreacted.

It was found that, by using the same molecular proportions, aconitic acid or itaconic acid could be substituted for the maleic anhydride, although the final gel was several hours in forming. Fumaric acid and citraconic anhydride were unsatisfactory under the conditions of working. The citraconic anhydride apparently reacted but failed to form a gel.

Under the conditions of working allyl formate was unsatisfactory as a substitute for the vinyl acetate.

In one case 3¾ oz. of monomeric vinyl acetate was heated in a reflux condenser with 5 oz. of the maleic anhydride castor oil product and 25 oz. of the toluol substitute together with a catalyst until it gelled. To this was added 7 oz. of the toluol substitute to arrest the reaction and the product run through the colloid mill.

In another case 4½ oz. of the vinyl acetate were heated with 6 oz. of the maleic anhydride compound and 24 oz. of the toluol substitute and 10 grams of acetyl benzoyl peroxide, being heated in a reflux condenser until a gel formed. Then there were added 12 oz. of a 50% rosin solution in the toluol substitute and an additional 5 oz. of the toluol substitute. The product was run through the colloid mill. All these products when spread upon paper or cellulose ribbon formed an excellent Scotch tape.

Aconitic acid and maleic acid and itaconic may be regarded as polybasic acids having an unsaturated bond to one side of both carboxyl groups.

The stability referred to above is sufficient to enable the solution of the adhesive to be used within a day or two. If it thickens it may be satisfactorily reprocessed by regrinding with more solvent in a colloid mill.

When the above addition agents were added some additional stability was always obtained, though ester gum was much the most satisfactory.

Having thus described certain embodiments of the invention, what I claim is:

1. The process of making a pressure-sensitive adhesive which consists in first heat reacting equi-molecular quantities of castor oil and a polybasic acid selected from the group consisting of maleic acid, aconitic acid and itaconic acid to form a clear viscous oil, further heat reacting the oil in an inert diluent in the presence of acetyl benzoyl peroxide catalyst with monomeric vinyl acetate to form a gel, adding more diluent to arrest the reaction, introducing a resin selected from the group consisting of rosin, hydrogenated rosin, ester gum and cumarone-indene, and grinding the product in a colloid mill.

2. The process of making a pressure-sensitive adhesive which consists in first heat reacting equi-molecular quantities of castor oil and maleic anhydride to form a clear viscous oil, further heat reacting the oil in inert toluol diluent in the presence of acetyl benzoyl peroxide catalyst with monomeric vinyl acetate to form a gel, adding more said diluent to arrest the reaction, introducing a resin selected from the group consisting of rosin, hydrogenated rosin, ester gum and cumarone-indene, and grinding the product in a colloid mill.

PHILIP L. GORDON.